United States Patent [19]

Wilson et al.

[11] Patent Number: 4,670,243

[45] Date of Patent: Jun. 2, 1987

[54] METHOD OF PRECIPITATING METAL TITANATE POWDERS

[75] Inventors: James M. Wilson; Dana L. Coller, both of Victor, N.Y.; Subramaniam Venkataramani, Parma, Ohio

[73] Assignee: Ferro Corporation, Cleveland, Ohio

[21] Appl. No.: 880,193

[22] Filed: Jun. 30, 1986

[51] Int. Cl.$^4$ .............................................. C01G 23/00
[52] U.S. Cl. ..................................................... 423/598
[58] Field of Search ........................................ 423/598

[56] References Cited

U.S. PATENT DOCUMENTS

| | | | |
|---|---|---|---|
| 2,974,008 | 3/1961 | Howatt | 423/598 |
| 3,292,994 | 12/1966 | Kiss et al. | 423/598 |
| 4,520,004 | 5/1985 | Uedaira et al. | 423/598 |

OTHER PUBLICATIONS

Flaschen, "J. American Chem. Soc.", vol. 77, 1955, p. 6194.

*Primary Examiner*—H. T. Carter
*Attorney, Agent, or Firm*—Shlesinger Fitzsimmons Shlesinger

[57] ABSTRACT

A titanium acylate solution is produced by adding glacial acetic acid to tetra-isopropyl titanate. Distilled water is then added until the solution clears, and a high grade alkaline-earth metal carbonate, such as $BaCO_3$, $SrCO_3$ or $CaCO_3$, or a combination thereof, is added and agitated until the earth-metal dissolves and the solution again becomes clear. An alkaline hydroxide, such as NaOH, is added until the pH of the solution reaches 13 or 10 above, and causes crystals of an earth-metal titanate to form in the solution. The solution is thereafter filtered to produce an alkaline-earth metal titanate filter cake which is then dried and washed to produce the desired powder. At no time during the process is it necessary to apply any external heat to the solution. The heat of reaction is sufficient.

15 Claims, 6 Drawing Figures

- DEGREES -

EXAMPLE I
Precipitate 46.5°    43.5°

METHOD OF PRECIPITATING METAL TITANATE POWDERS

BACKGROUND OF THE INVENTION

This invention relates to a novel method of precipitating alkaline-earth metal titanates in powder form from clear, homogeneous solutions of the desired titanate constituents. More specifically, this novel method involves the direct precipitation of titanates from such solutions rapidly, and without the need for the application of any external heating source.

Barium titanate is a material of great interest for electronic applications due to its ferroelectric behavior, i.e., a spontaneous alignment of electric dipoles within the material itself. Modifying the transition temperature at which this ferroelectric behavior occurs allows the production of components such as multilayer ceramic capacitors and thermistors with optimized electronic properties. Materials such as other alkaline-earth titanates and zirconates are widely known as being effective in performing such modifications.

As the trend in electronic circuitry continues toward higher levels of sophistication, increased board densities, and increased volumetric efficiencies in components, the need to supply newer, improved materials for component production is emerging. Conventionally, barium titanate and other titanate materials are prepared by high temperature calcination of the appropriate precursor materials. Specifically, barium carbonate ($BaCO_3$) and titanium dioxide ($TiO_2$) are mixed in the desired stoichiometric amounts and calcined at 1000°–1200° C. to form barium titanate ($BaTiO_3$). Materials produced in this manner are hindered in their applications for the smaller, more sophisticated devices for several reasons. Mixing and post-calcination pulverization processes introduce uncontrollable and undesirable levels of impurities. The high calcination temperatures yield a powder which is of large and non-uniform grain sizes. In addition, the calcining process is expensive and thermal treatment is difficult to control. Also, mixing and calcining of precursors in the solid form is not entirely homogeneous and variations in particle to particle stoichiometry certainly exist.

Another popular method for commercial production of barium titanate ceramic powders is the thermal decomposition of barium titanyl oxalate tetrahydrate $BaTiO(C_2O_4)2.4H_2O$ to form very fine $BaCO_3$ and $TiO_2$ crystallites which subsequently react in the solid state to form $BaTiO_3$. (Clabaugh, W. Stanley, Swiggard, Edward M., and Gilchrist Raleigh, "Preparation of Barium Titanyl Oxalate Tetrahydrate for Conversion to Barium Titanate of High Purity", *Journal of Research of the National Bureau of Standards*, Vol. 56, No. 5, May 1956, pp. 289–291). Although this method developed by Clabaugh et al. produces a titanate material of higher purity and reactivity than the mixed oxide calcination process, high pyrolization/calcination temperatures of 750°–1100° C. are still required to form single phase $BaTiO_3$. In addition, $Ba^{++}$ ion solubility in the precipitate mother liquor and the solid-state reaction processes necessary to form $BaTiO_3$ do not allow a resultant material which is completely homogeneous in stoichiometry.

Various other methods such as those disclosed in U.S. Pats. Nos. 3,330,697 and 4,534,956, as well as others such as sol-gel or alkoxide methods have also been successfully employed. (Ritter, J. J., Roth, R. S., and Blendell, J. E., "Alkoxide Precursor Synthesis and Characterization of Phases in the Barium-Titanium Oxide System", *Journal of the American Ceramic Society*, Vol. 69, No. 2, 1986. pp. 155–162; Mazdiyasni K. S., Dolloff, R. T., and Smith J. S. II, "Preparation of High-Purity Submicron Barium Titanate Powders", *Journal of the American Ceramic Society*, Vol. 52, No. 10, 1969, pp. 523–526; and Wu, Edward, Chen, K. C., and Mackenzie J. D., "Ferroelectric Ceramics—The Sol-Gel Method Versus Conventional Processing", Materials research Society Symposia Proceedings, Vol. 32, *Better Ceramics Through Chemistry*, Copyright 1984 by Elsevier Science Publishing Co, Inc. pp. 169–174). Although these methods result in fine sub-micron powders of near uniform size, they are also hindered by such factors as the need for calcination treatments, exotic manufacturing schemes, low product yields, and/or the use of exotic precursor materials.

The literature has also suggested techniques for the hydrolysis of titanium esters in the presence of alkalineearth metal ions at higher pH values as a route to $BaTiO_3$ formation. (Flachen, Steward S., "An Aqueous Synthesis of Barium Titanate", *Journal of The American Chemical Society*, Vol. 77, 1955, p. 6194; and Kiss, Klara, Mager, Jules, Vukasovich, Mark S., and Lockhart, Robert J., "Ferroelectrics of Ultra-fine Particle Size: I, Synthesis of Titanate Powders of Ultra-fine Particle Size", *Journal of The American Ceramic Society*, Vol. 49, No. 6, 1966, pp. 291–295.). However, sophisticated laboratory apparatus and external heating sources were employed to develop critical conditions necessary to form the desired product. The degree of control that is necessary would most certainly limit the commercialization potential for these processes.

The recently issued U.S. Pat. No. 4,520,004 discloses a process for manufacturing fine alkaline-earth metal titanates by combining a water soluble salt of Ba, Sr, or Ca with a hydrolized product of a titanium compound in an aqueous alkaline solution having a pH greater than 13. More specifically, this method begins with the preparation of an inorganic titanium compound such as $TiO_2.xH_2O$ by neutralizing $TiCl_4$ or $Ti(SO_4)_2$ in an aqueous or alkaline solution, and then reacting the product with a water soluble salt of Ba, Sr, or Ca in an aqueous alkaline solution having a pH of 13 or more and a temperature of approximately 100° C. The process produces a fine precipitate which can then be filtered from the solution. The disadvantage of this process is that, as a practical matter, it requires the application of an external heating source to maintain elevated temperature during the reaction of the hydrolysis product with the water soluble salt. The temperatures necessary for conversion are selected to be preferably above 60° C., and are actually in the 100° C. area to optimize the process.

Contrary to the above-noted teachings, applicants have discovered that metal titanates, and in particular alkaline-earth metal titanates and combinations thereof, can be directly synthesized or precipitated from a complex titanium alkoxide immersed in an acetic acid solution without requiring the application of any external heating source during the precipitation process (i.e., relying solely on the heat of chemical reaction to facilitate $BaTiO_3$ production) and without requiring the use of a water soluble alkaline earth metal salt.

A primary object of this invention, therefore, is to provide an improved method of precipitating fine metal titanates of precise stoichiometric proportions directly from a mixture of a complex titanium alkoxide and an alkaline earth metal, without having the need to apply any external heating source to enact the precipitation process.

Still another object of this invention is to provide an improved method of the type described which obviates the need for utilizing the more costly and less commercially-available water soluble alkaline earth metal salt as a precursor in the process.

Other objects of the invention will be apparent herein to one skilled in the art from the specification and from the appended claims, particularly when read in conjunction with the accompanying drawings.

SUMMARY OF THE INVENTION

A titanium acylate solution is produced by adding glacial acetic acid to tetra-isopropyl titanate. Distilled water is added until the solution clears. A high grade alkaline earth metal carbonate, such as $BaCO_3$, $SrCO_3$ or $CaCO_3$, or combinations thereof, is added and agitated until the alkaline-earth metal dissolves and the solution becomes clear. An alkaline hydroxide, such as NaOH, is added until the pH of the solution reaches 13 or above. This causes crystals of the alkaline-earth metal titanate to form in the solution, which is thereafter filtered to produce an alkaline-earth metal titanate filter cake or residue. This cake is then dried and washed to produce the desired powder.

During this process it is not necessary to apply any external heat applied to the solution. The solution is exposed only to the heat of reaction generated by the additions to the solution.

THE DRAWINGS

Figure 2:
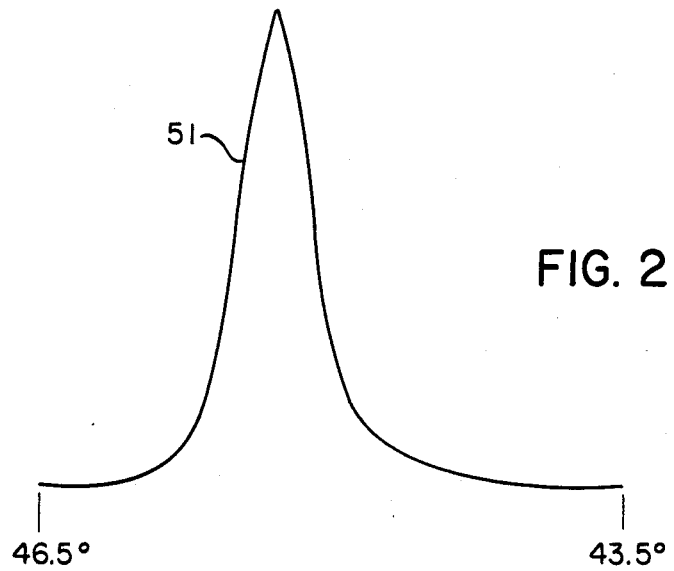
FIG. 2 is a greatly enlarged portion of the diffraction pattern of FIG. 1 evidencing the cubic phase nature of this precipitated powder.
Figure 5:
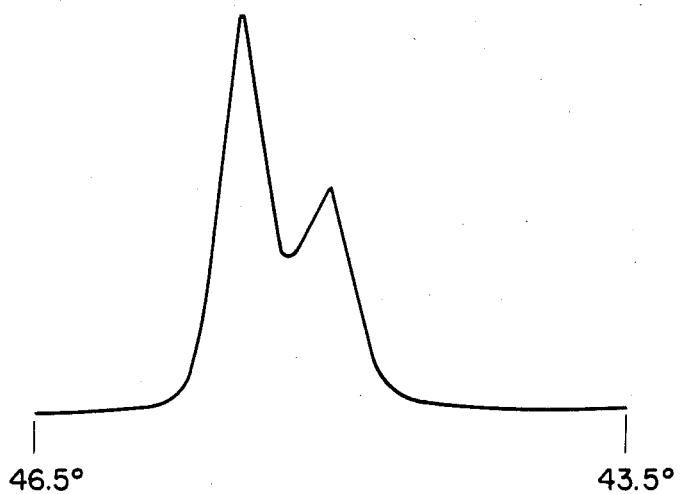
Figure 6:
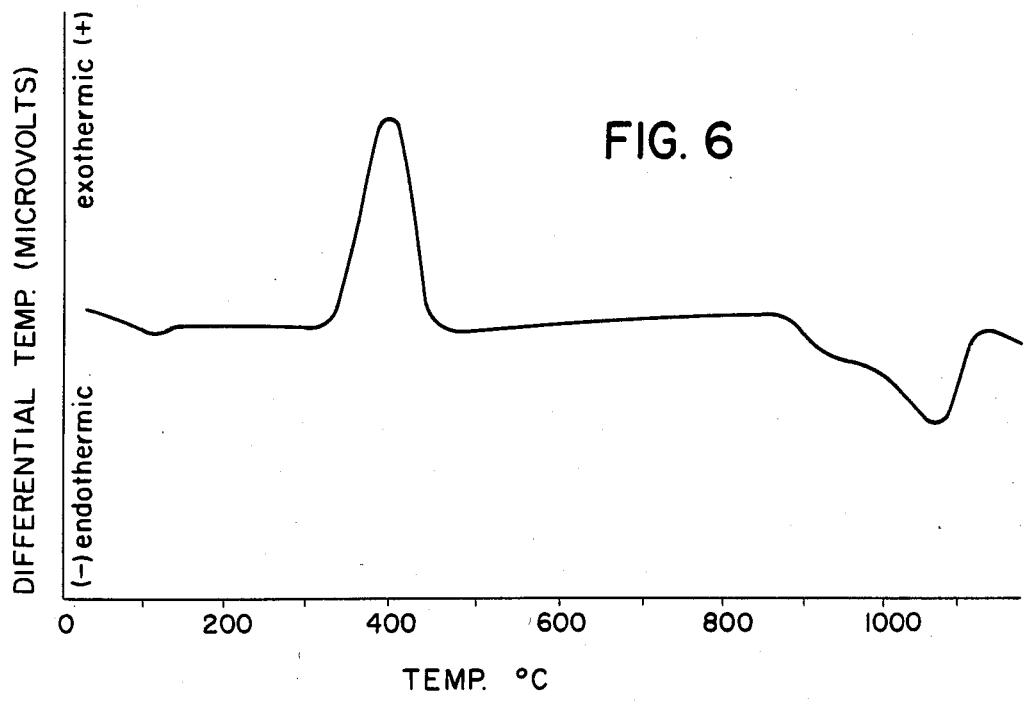

FIG. 5 is view similar to FIG. 2, but showing an enlarged portion of an X-ray diffraction pattern of this powder after it has been heated to 900° C., and evidencing its conversion to a tetragonal phase; and FIG. 6 is a graph showing the results of a differential thermal analysis of a precipitated $BaTiO_3$ powder made according to a second embodiment of this invention in which $BaCl_2$ was used as a precursor instead of $BaCO_3$.

PREFERRED EMBODIMENTS OF THE INVENTION

As noted hereinafter, applicants' novel method permits the production of various metal titanates by the direct precipitation of the desired titanates provided the stoichiometric amounts of alkaline earth metal carbonates are employed with a tetra-isopropyl titanate, such as $Ti(OC_3H_7)_4$. A high grade carbonate is used in the process to assure the desired stoichiometric amounts of alkaline earth metal (for instance, $B_a^{+2}$, $Sr^{+2}$ and $Ca^{+2}$) carbonates. Examples of the direct precipitations of the alkaline earth metal titanates, and combinations thereof are as follows:

EXAMPLE I

High purity $BaTiO_3$ of precise stoichiometry and of particularly fine particle size was produced by mixing a tetra-alkyl titanate with glacial acetic acid to form a titanium acylate solution to which a suitable source of an alkaline earth metal was slowly mixed, after which the pH of the mixture was adjusted to a value greater than 13. The excess mother liquor was filtered, and the filter cake was dried and washed free of sodium to produce stoichiometric $BaTiO_3$ with a mole ratio of 1:1.

More specifically, 78.58 g (0.27522 moles) of tetraisopropyl titanate were mixed, while agitating, with 157 g of glacial acetic acid to form a titanium acylate solution. Distilled water in the amount of 52 ml was added to the acylate solution and agitated until all of the hydrolized mixture became clear. A high grade of $BaCO_3$ in the amount of 54.44 g (0.27522 moles) was then slowly added to the acylate solution and agitated until the solution once again became clear. Thereafter the Ba-Ti solution was slowly added to a NaOH solution (600 mL of distilled water plus 120 g of NaOH pellets), while agitating vigorously. This raises the pH of the combined solution to a value greater than 13.0.

Figure 1:
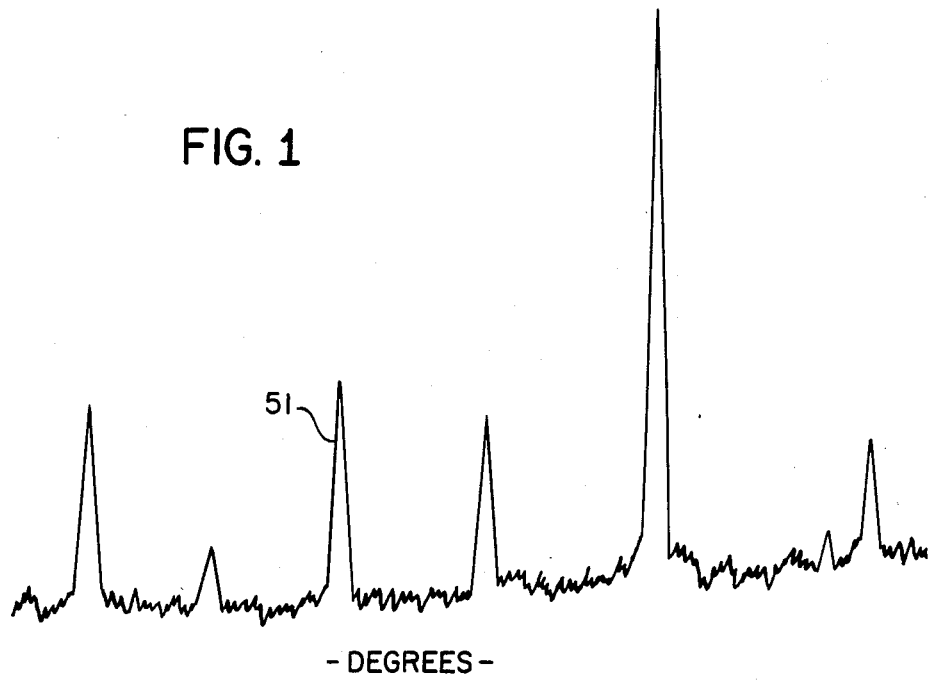
FIG. 1 is an X-ray diffraction pattern of a precipitated $BaTiO_3$ powder as initially produced according to one embodiment of the invention in which $BaCO_3$ was used as a precursor.
Figure 4:
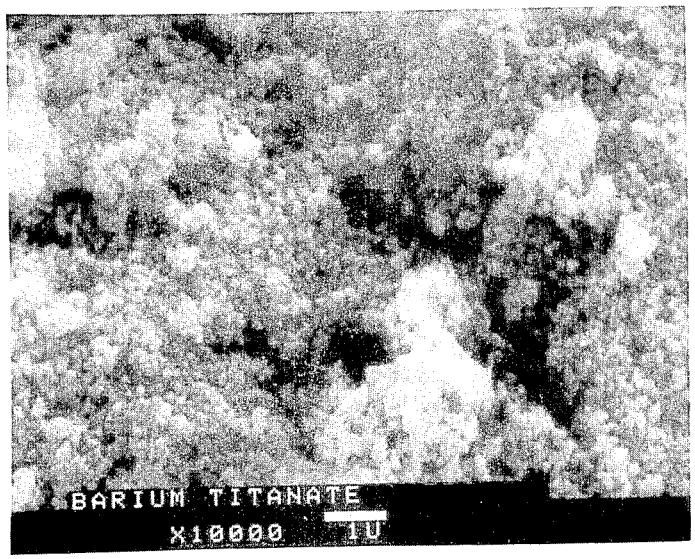
FIG. 4 is a photomicrograph of this powder as it appears when enlarged 10,000x.

The precipitated slurry was then filtered, and the filter cake dried at approximately 115° C. The resultant powder was then washed with distilled water in order to remove the sodium previously introduced by the sodium hydroxide solution. Wet chemical analysis of the filtered mother liquor indicated that it contained less than 2.0 ppm of soluble Ba, and less than 0.5 ppm soluble Ti. An X-ray diffraction analysis of the dried filtrate produced a pattern as shown in FIG. 1, and established the presence of a single-phase $BaTiO_3$ having a Ba/Ti mole ratio of approximately 1.0 within plus or minus 0.003. Peak 51 of the pattern (FIGS. 1 and 2), which occurred at approximately 45.4 degrees 2 theta, indicated the cubic phase of the powder. Tests also confirmed that the dry filtrate measurement HAc for soluble barium was approximately 4.0%; HCl for insoluble residue was 0.2%; LOI at 300° C. was approximately 1.4%; surface area was $22M^2/gm$.; and scanning electron microscope (SEM) examination, in the form of the photomicrograph shown in FIG. 4, indicated an average particle size of less than 0.2 $\mu m$. (In FIG. 4 the bar denoted as 1U corresponds to a measurement of one micron.)

Figure 3:
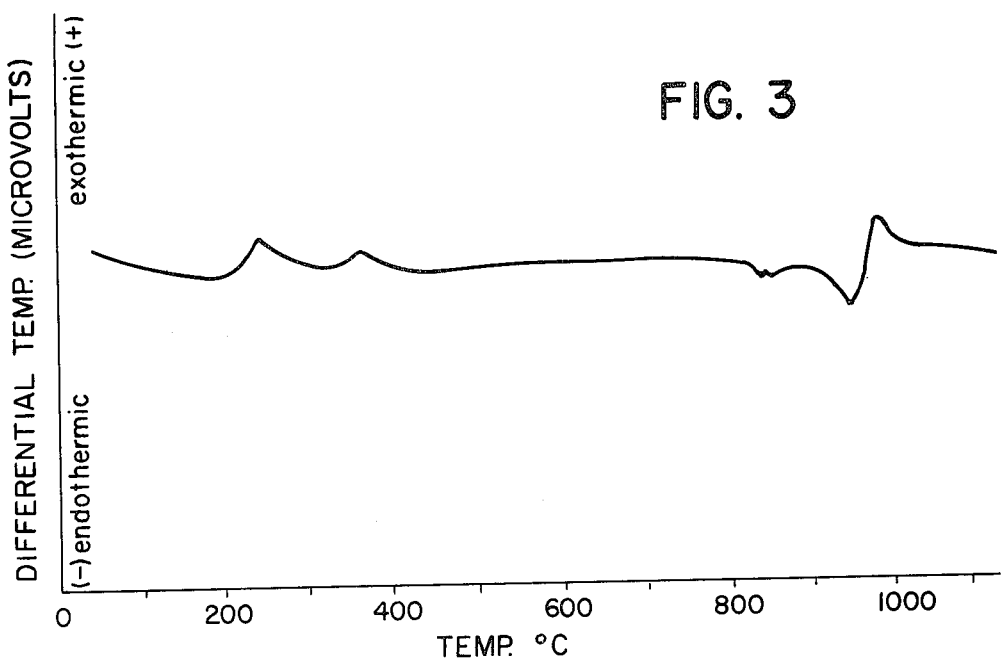
FIG. 3 is a graph showing the results of a 10 differential thermal analysis of this powder.

A differential thermal analysis of the powder (see the FIG. 3 graph) indicated the occurrence of a slight exothermal reaction in the powder, when heated in the range of 200°-400° C., and an endothermic reaction and conversion of the powder to its tetragonal phase, when heated into the range of 900°-1000° C., or more specifically to approximately 950° C. This change is evidenced also by the difference between the peak 51 of the pattern as shown in FIG. 2, and the similar, but double peaked pattern 54, 54-1 (FIG. 5) of the heat treated powder.

From these results, it is clear that precisely controlled stoichiometric metal titanate powders can be directly precipitated from a liquid solution without the need for expensive reaction vessels and associated external heating sources. Moreover, through the use of a metal carbonate, rather than a water soluble alkaline earth metal salt, it is possible to reduce the overall cost of the method, as compared to prior methods, since such carbonates are relatively abundant and inexpensive, as compared to precursors employed in other such known processes.

EXAMPLE II

Powdered $SrTiO_3$ of high purity was also processed from a combination titanium alkoxide and acetic acid solution in the same manner as described above. In this example the same quantities of tetra-isopropyl titanate, glacial acetic acid and distilled water were combined and agitated as in Example I. Instead of using barium carbonate, 40.78 g (0.27522 moles) of strontium carbonate ($SrCO_3$) were slowly added to the titanium acylate solution, together with an additional 300 ml of distilled water, which was required in order to dissolve the strontium carbonate. Thereafter the Sr-Ti solution was slowly added to the NaOh solution (consisting of 120 g NaOH pellets) while agitating, thereby producing a precipitated slurry. The excess mother liquor was filtered, and the filter cake dried at 115° C. The powder was then washed with distilled water to remove the sodium. The soluble Sr and Ti contents of the mother liquor were substantially the same minute quantities as in the case of Ba and Ti of Example I (Sr=2ppm, Ti=0.5 ppm). X-ray diffraction of the dry powder indicated a strong $SrTiO_3$ pattern. Moreover the mole ratio of Sr to Ti was approximately 1.002; soluble strontium in the filtrate (HAc) was approximately 1.8%; the insoluble residue (HCl) was 0.2%; and LOI was 3.79%.

EXAMPLE III

Very fine grain $CaTiO_3$ was processed by the same method as described above, where, instead of $BaCO_3$ or $SrCO_3$, calcium carbonate ($CaCO_3$) was slowly added to the titanium acylate solution in the amount of 27.82 g (0.27522 moles); and in order to completely dissolve this carbonate, distilled water had to be added in a total amount of 250 ml. The other quantities of the constituents were the same as in Example I. Test results indicated soluble Ca in the filtered mother liquor was less than 0.5 ppm; X-ray diffraction indicated a strong $CaTiO_3$ pattern; soluble calcium in the powder (HAc) was 1.0%; and LOI 4.0%.

EXAMPLE IV

A combined barium strontium titanate ($Ba_{0.8}Sr_{0.2}TiO_3$ was also prepared by the above-noted process in which the constituents were in the amounts as in Example I, except that distilled water amounted to 352 ml, barium carbonate amounted to 43.55 g, and strontium carbonate amounted to 8.16 g. The Ba-Sr-Ti solution was slowly added to the NaOH solution as in preceding examples, after which the precipitant was filtered, dried and washed as above. Test results indicated soluble barium in the filter liquor at 10 ppm, soluble Sr at 1.4 ppm and soluble Ti less than 0.5 ppm. X-ray diffraction indicated a strong $Ba_{0.8}Sr_{0.2}TiO_3$ pattern; soluble barium in the powder (HAc) was 0.8%; insoluble residue (HCl) measured 0.3%; and LOI 3.6%.

Tests were also conducted to determine whether or not there was in fact a significant difference between applicants' method of precipitating out metal titanate powders and those suggested by the prior art. This was done by substituting for the precursors employed in applicants' novel method, precursors of the type, disclosed by the prior art. In one such test, for example, tetraisopropyl titanate such as employed in applicants' above-noted Examples, was replaced by $TiCl_4$, such as suggested in the above-noted U.S. Pat. No. 4,520,004. The $TiCl_4$, containing a quantity of titanium equivalent to that employed in Example I above, was mixed with the same amount of acetic acid, distilled water, barium carbonate and sodium hydroxide as in Example I, and was processed in the same manner as in Example I, except that an additional 250 mL of distilled water had to be added to dissolve the $BaCO_3$. The pH was increased, with a NaOH solution, to a value greater than 13. A precipitate was produced, filtered, dried and washed. Test results indicated that soluble Ba was present in the filtered mother liquor in the amount of 3,645 ppm (a loss of approximately 2.8 g of barium), and no soluble Ti. This significant loss of Ba led to a low mole ratio of 0.735.

Still another test was conducted to determine whether or not stoichiometric barium titanate could be produced substituting in the method taught by the above-noted U.S. Pat. No. 4,520,004, barium carbonate in place of $BaCl_2$, and by applying no external heat whatsoever to the reaction process. The precursors for this method included $TiCl_4$ (50% diluted) in an amount of 102.90 g (0.27522 moles), distilled water in the amount of 52 ml with an additional 178 ml needed to dissolve the $BaCO_3$. The pH was then increased, with a NaOH solution to a value greater than 13. The slurry was, as above, filtered, dried, and washed. Soluble Ba in the filtered mother liquor amounted to 6,222 ppm (a loss of approximately 12 g of Ba), and soluble Ti in the amount of 2.5 ppm. Again, the significant loss of barium led to a very low mole ratio of 0.550.

It was found that some water soluble salts, such as $BaCl_2$, may be substituted as a source of the barium ion in the applicant's process, but $BaCO_3$ is the preferred precursor due to its availability and low cost.

From the foregoing, it will be readily apparent that the applicants have developed an improved method of effecting precipitation of metal titanate powders, and in particular alkaline earth metal titanate powders. Unlike prior art methods, it is not necessary with applicants' method to utilize external or additional heat in order to maintain the reaction temperature well above the normal reaction temperature or room temperature. Furthermore unlike the process disclosed in, for example, U.S. Pat. No. 4,520,004 it is not necessary for applicant to utilize an inorganic titanium compound as a precursor, not for that matter is it necessary to use a water soluble salt of an alkaline earth metal for effecting precipitation of a crystalline metal titanate in a solution. On the contrary, it is possible to use water insoluble carbonates for producing a $Ba^{+2}$, $Sr^{+2}$ or $Ca^{+2}$ ion's for reaction with the titanium acylate solution. As a consequence, this novel process eliminates the need for using, as noted above, expensive reaction vessels and external heating sources.

The extremely fine $BaTiO_3$ pwoder produced by this process can be readily converted to its tetragonal crystal structure simply by heating to approximately 950° C., and in the latter form exhibits desirable ferro electric properties—i.e., when subjected to an electric field spontaneous polarization of its electric dipoles occurs. And in this fine powder form the material can be readily sintered to its optimum density. Although the $SrTiO_3$, $CaTiO_3$ and $Ba_{0.8}Sr_{0.2}TiO_3$ powders produced in accordance with Examples II, III and IV do not convert to tetragonal crystal form upon heating (i.e., remain cubic), they nevertheless can likewise be readily sintered to optimum density, and can be added to modify the transition temperature of Curie point of a $BaTiO_3$ composition.

While this invention has been described in detail in connection with only certain embodiments thereof, it will be apparent that it is capable of further modification, and that this application is intended to cover any such modifications as may fall within the scope of one skilled in the art of the appended claims.

What is claimed is:

1. A method of producing alkaline earth-metal titanates in powder form, comprising
    preparing an acidic titanium acylate solution,
    adding to said acidic solution a water insoluble alkaline earth-metal carbonate and causing the alkaline earth-metal ions from the carbonate to solubilize in the acidic solution,
    thereafter adding an alkaline hydroxide to raise the pH of the solution to 13 or above, and to precipitate alkaline earth-metal titanate crystals in the solution, and
    filtering said crystals from the solution to produce a filter cake comprising an alkaline earth-metal titanate in powder form.

2. A method as defined in claim 1 in which said solution is not subjected to any heat, other than the heat of reaction generated as the result of the preparation of said titanium acylate solution, and any subsequent reactions caused by the additions thereto.

3. A method as defined in claim 1, wherein said alkaline earth-metal carbonate is selected from the group consisting of Ba, Sr and Ca carbonates and combinations thereof.

4. A method as defined in claim 1, wherein said titanium acylate solution is prepared by mixing a tetra-alkyl titanate with glacial acetic acid.

5. A method as defined in claim 4, wherein tetra-alkyl titanate is tetra-isopropyl titanate.

6. A method as defined in claim 1, including washing drying and heating the filter cake to a range of 900°–1000° C. to cause its crystalline structure to change from cubic to tetragonal.

7. A method of producing alkaline-earth metal titanate in powder form, comprising
    mixing titanium alkoxide and an acid to form an titanium acylate solution,
    adding to said acidic solution water and a water insoluble alkaline-earth metal carbonate in quantities sufficient to cause the alkaline-earth metal in the carbonate to dissolve in the acidic solution,
    thereafter adding an alkaline hydroxide to the solution to raise the solution pH to 13 or above, and to precipitate alkaline-earth metal titanate crystals in the solution,
    filtering the crystals from the solution to produce a filter cake, and
    drying and washing the cake to produce the the desired powder.

8. A method as defined in claim 7, including mixing said titanium alkoxide with acetic acid in ratios of approximately 1:2 to form said titanium acylate solution.

9. A method as defined in claim 8, wherein said titanium alkoxide is tetra-isopropyl titanate.

10. A method as defined in claim 7, wherein said carbonate is selected from the group consisting of Ba, Sr, and Ca carbonates and mixtures thereof.

11. A method of producing alkaline earth-metal titanate chemical powders by direct precipitation from a chemical reaction product produced without the application of any heat other than that generated by the heat of reaction, comprising
    mixing water, glacial acetic acid and an organic titanium compound in ratios of approximately 1:3:1.5 to form a clear, acidic titanium acylate solution,
    mixing a water insoluble alkaline earth-metal carbonate in the acidic solution effectively to dissolve the alkaline earth-metal of the carbonate in the solution,
    thereafter adding an alkaline hydroxide to said mixture in quantities sufficient to raise the solution pH to 13 or above, and to cause alkaline earth-metal titanate crystals to form in the solution, and
    filtering said crystals from the solution to form a filter cake comprising an alkaline earth-metal titanate in powder form.

12. A method as defined in claim 11, wherein said alkaline-earth metal titanate carbonate is selected from the group consisting of Ba, Sr, and Ca carbonates and mixtures thereof.

13. A method as defined in claim 11, wherein said titanium compound is a tetra-alkyl titanate.

14. A method as defined in claim 13, wherein said alkaline hydroxide is NaOH.

15. A method as defined in claim 11, wherein said alkaline-earth metal carbonate includes $BaCO_3$ and $SrCO_3$.

* * * * *